June 5, 1956  G. A. LYON  2,748,457
PRY-OFF TOOL
Original Filed Dec. 28, 1949  2 Sheets-Sheet 1
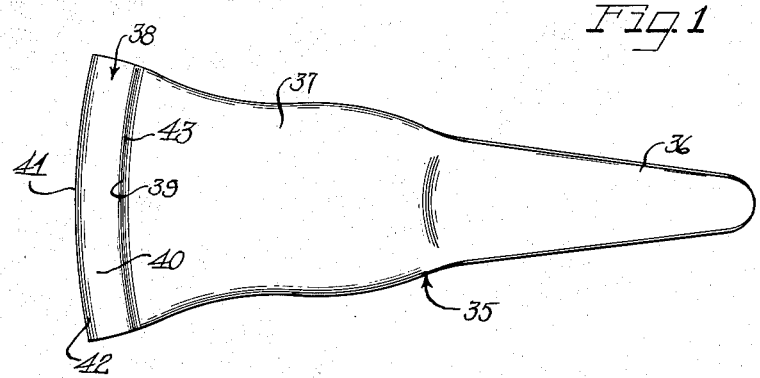
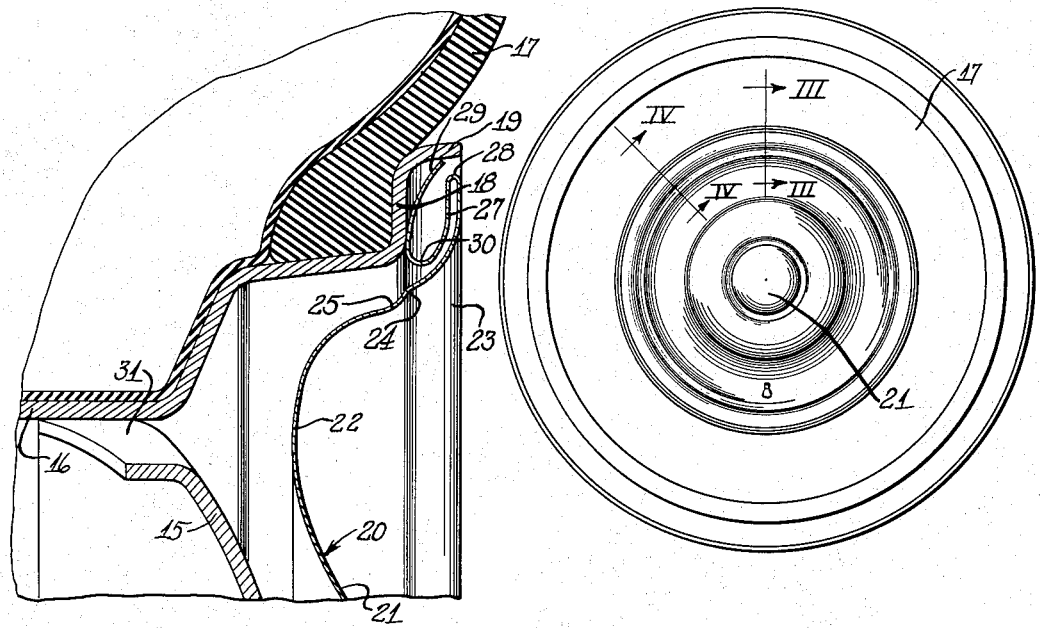
Inventor:
George Albert Lyon
by *Hill, Sherman, Meroni, Gross & Simpson*
Attys

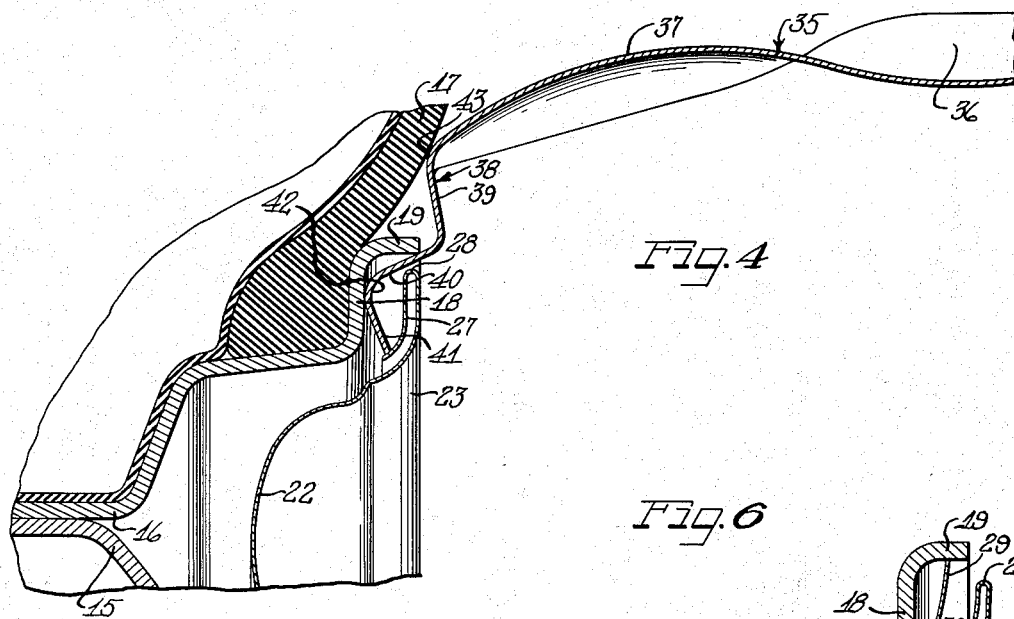
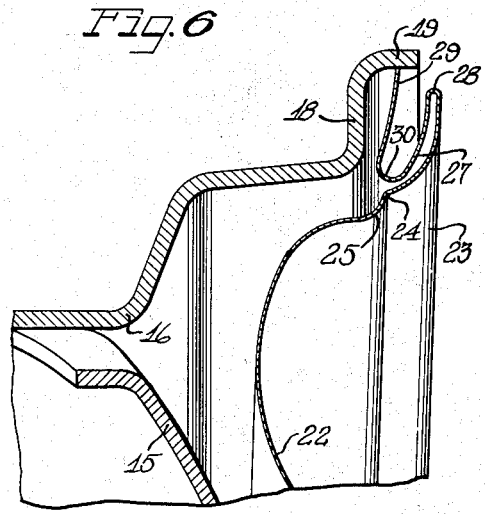
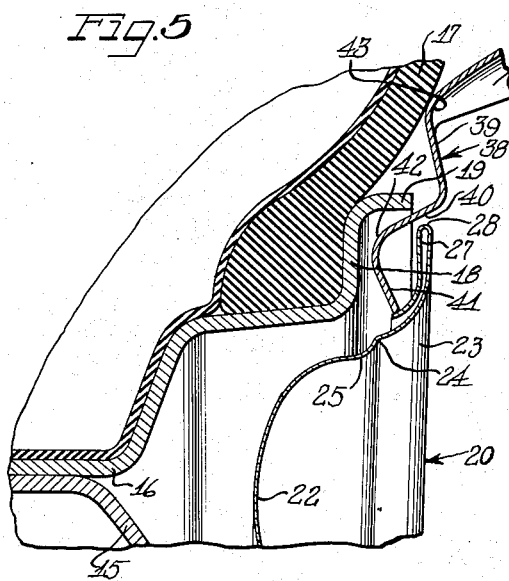

United States Patent Office 2,748,457
Patented June 5, 1956

2,748,457
PRY-OFF TOOL

George Albert Lyon, Detroit, Mich.

Original application December 28, 1949, Serial No. 135,469, now Patent No. 2,683,628, dated July 13, 1954. Divided and this application September 10, 1951, Serial No. 245,938

2 Claims. (Cl. 29—245)

The present invention relates to a tool for facilitating removal of wheel covers from wheels to which the covers have been applied and more particularly relates to a pry-off tool for this purpose.

The theft of wheel covers and other auto appliances is unfortunately quite prevalent at the present. To prevent theft there have been devised attachment means for wheel covers which are not readily disengaged from a vehicle wheel by the use of ordinary tools such as a screw driver.

An example of such a wheel cover attachment is found in my copending application for patent entitled "Wheel Structure" filed December 28, 1949, Serial No. 135,469, now Patent No. 2,683,628, dated July 13, 1954, of which the present application is a division.

An important object of the present invention resides in the provision of improved means for removing a wheel cover from a wheel to which the cover has been applied.

Another important object of the invention is to provide a tool for removing a wheel cover which affords maximum rigidity with minimum material.

A further object of the invention is to provide a tool which is conveniently inserted between the cover and the wheel for the wheel cover removing operation.

Yet another object of the invention is to provide a tool which will afford a large area of engagement with the wheel cover during removal operation.

According to the general features of the present invention there is provided a pry-off tool including a handle and body portion, a pry-off head and a juncture between the handle and body portion and the head, the head including an outwardly extending intermediate flange and a pry-off tip flange angular to said intermediate flange, the juncture constituting a tire side wall engaging fulcrum shoulder.

According to other general features an intermediate flange affords a tire rim engaging fulcrum.

According to still other general features a pry-off tool includes a terminal portion having a configuration generally corresponding to that of the terminal flange portions of a tire rim.

Other objects, features and advantages of the present invention will be readily apparent from the following detailed description of a preferred embodiment thereof taken in conjunction with the accompanying drawings, in which:

Figure 1 is a top plan view of a pry-off tool according to the present invention;

Figure 2 is a side elevational view of a vehicle wheel having a cover applied thereto which is conveniently removed by the pry-off tool of the present invention;

Figure 3 is an enlarged radial sectional view taken substantially on III—III of Figure 2;

Figure 4 is a radial sectional view taken substantially along the line IV—IV of Figure 2 showing the use of a novel pry-off tool for removing the cover;

Figure 5 is a radial sectional view similar to Figure 4 but showing the cover partly detached from the wheel; and Figure 6 is a radial sectional view similar to Figure 3 showing the cover partly detached from the wheel.

As shown on the drawings:

The present invention is especially useful with a vehicle wheel of the kind currently in use on automobiles and the like and including a wheel body 15 and a tire rim 16 to which the wheel body is attached in any suitable fashion. The tire rim 16 is of the multi-flange, drop center type adapted to support a pneumatic tire and tube assembly 17 and having at its outer side an angular terminal flange structure including a generally radially extending portion 18 and a generally axially outwardly extending portion 19.

The novel pry-off tool of the present invention can be conveniently understood by reference to a wheel cover of the type which is difficult to remove with ordinary tools such as a screw driver. Such a cover may be desirable to discourage theft of the wheel cover. A wheel cover of this type will now be described in order that the manner of use of the pry-off tool may be better understood by a description of the use thereof with a particular wheel cover. This wheel cover is described and claimed in the above-mentioned copending application.

At its outer side the wheel is protectively and ornamentally covered by a wheel cover 20 which in the present instance is of the one piece overall or full disk type. To this end the cover comprises a more or less axially outwardly projecting crown portion 21, an annular intermediate cross sectionally dished or concave portion 22 generally simulative of the intermediate or large juncture groove customary between the tire rim and the bulging portion of the wheel body, and a marginal convex portion 23 arranged to be disposed in substantial concealing relation to the outer side of the tire rim.

Means are provided at the outer margin of the wheel cover for self-engaging, snap-on, pry-off retaining cooperation with the terminal flange structure of the tire rim. For this purpose the marginal portion 23 of the cover affords a substantially rigid annular rib which is further reinforced and stiffened by a generally axially inwardly extending annular rib 24 at the inner side of the marginal portion 23 and at juncture of the marginal portion with the intermediate portion 22 of the cover. Additional reinforcement for the cover margin is afforded by a narrow annular convex rib 25 at juncture of the rib 24 with the intermediate portion 22. Hence the marginal area of the cover is strongly reinforced by an undulating pattern of reinforcing ribs 23, 24 and 25 reading from the outer edge of the cover inwardly.

Yet additional reinforcement for the outer margin of the cover is afforded by an underturned concave convex annular flange 27 which by preference lies parallel in spaced relation behind the marginal rib 23, extending generally radially inwardly and then turning axially inwardly to a point adjacent to the inwardly extending reinforcing rib 24. At juncture of the flange 27 with the marginal rib 23 a short radius edge stiffening rib of more or less bead-like shape 28 is provided which faces radially outwardly and lies on a cover edge circumference slightly less than the inside diameter of the terminal flange portion 19 of the tire rim adjacent to which and radially inwardly from the inner side of the tip of which terminal flange portion 19 the edge rib 28 is adapted to be disposed in full assembly with the wheel. For this purpose, the inner, axially inwardly projecting edge of the underturned marginal flange 27 is provided with a plurality, herein four equidistantly spaced generally radially and axially outwardly extending retaining fingers 29 arranged to engage endwise against the inner face of the axially extending portion 19 of the tire rim terminal flange in retaining, gripping relation. Each of the retaining fingers 29 is longer than the underturned flange 27 to a sufficient extent to project radially outwardly beyond the perimeter of the cover sufficiently to bridge the gap between the cover perimeter or edge and the tire rim terminal flange portion 19 and actually to an extent such that normally the tips of the fingers lie on a circumference of greater diameter than the diameter of the inner face of the terminal flange portion 19. At juncture with the inner margin of the flange 27, the fingers 29 are formed with respective juncture ribs 30 of substantial radius in cross section and lying on the radius of the inner edge of the flange 27 throughout the length of the ribs. By reason of the substantial radius cross section of the ribs 30, the inner margins of the fingers 29 project substantially axially inwardly, and by preference such projection is of an extent which enables seating of the inner shoulder at the inner margins of the fingers against the inner margin of the radial terminal flange portion 18 substantially at juncture of the flange portion with the intermediate flange of the tire rim. The relative spacings involved are such that the outer marginal rib 23 of the wheel cover is thus disposed at substantially the plane of the edge of the tire rim terminal flange outer portion 19 in the full assembly of the cover with the wheel. The retaining tips of the retaining fingers 29 are formed on a circle conforming to the radius of the annular inner face of the terminal flange portion 19 and the width of each of the fingers is such as to engage a relatively large arc, in each instance, of the terminal flange portion 19.

In applying the cover 20 to the wheel, the cover is generally centered with respect to the outer side of the wheel and with the inner faces of the retaining fingers 29 resting against the edge of the terminal flange portion 19. Then, by pressing axially inwardly against the cover the retaining fingers 29 are caused to yield and snap into inwardly camming, retaining engagement with the tire rim terminal flange, the cover being fully assembled with the wheel when the inner shoulders of the fingers engage against the terminal flange portion 18. In this fully retained relationship of the cover, the retaining fingers 29 are held under radially inward stress which affords a radially outward strong gripping reaction of the tips of the fingers against the inner face of the terminal flange portion 19. As best seen in Figure 3, in the retaining relationship to the tire rim, the fingers are somewhat bowed concavely as permitted by the substantial resilience inherent in the fingers resulting from the length of the fingers and the peripheral curvature on which the juncture ribs 30 thereof are formed. As a result, the resilient tension in the retaining fingers acts to force the inner seating shoulders of the fingers tightly against the tire rim flange portion 18 and thus strongly resist accidental dislodgement of the cover from the wheel.

By reason of the spaced relation of the periphery of the cover from the tire rim terminal flange portion 19 and the spaced relation of the inner edge of the underturned marginal flange 27 from the tire rim, a free passage is afforded about the outer margin of the cover for air circulation through the wheel by way of wheel openings 31 between the wheel body 15 and the tire rim 16, as best seen in Figures 4 and 5.

Although the wheel cover 20 is quite thoroughly retained on the wheel during service, the particular construction of the cover margin and the retaining fingers 29 enables the cover to be pried off of the wheel with substantial facility when necessary.

Pry-off of the cover 20 is substantially facilitated by the use of a special pry-off tool 35 as shown in Figures 1, 4 and 5. This tool is preferably made from sheet metal stamped to form and comprises a handle portion 36 of transversely concave form, an intermediate convex body portion 37 and a pry-off head 38. The sinuous, multi-curved body and handle portions of the tool afford maximum rigidity with minimum material. The pry-off head portion of the tool comprises a plurality of angular flanges including an inwardly right angular juncture flange 39, an outwardly right angular intermediate flange 40 and a generally inwardly and rearwardly angled pry-off tip flange 41. The configuration of the terminal portion of the head including intermediate flange 40 and pry-off tip flange 41 corresponds to that of the terminal flange portions 18, 19. Juncture between the intermediate and pry-off tip flanges 40 and 41 is on a rounded shoulder 42. The arrangement of the flanges of the pry-off head 38 is such that the pry-off tip flange 41 is conveniently inserted into the gap between the cover periphery 28 and the terminal flange portion 19 and the pry-off head inserted between the margin of the cover and the terminal flange until the end of the pry-off tip flange 41 engages against the inner margin of the underturned marginal flange 27. As will be observed from Figure 1, the pry-off head 38 is formed on the radius of the inner side of the terminal flange portion 19 and is of quite substantial width so as to afford a large area of engagement between the pry-off tip flange 41 and the underturned marginal flange 27 of the cover.

With the pry-off tool 35 assembled with the tire rim and cover, substantially as shown in Figure 4, the shoulder 42 of the pry-off head engages against the tire rim flange portion 18 and the intermediate head portion 40 engages against the edge of the tire rim terminal flange portion 19. Thereupon by levering the handle 36 the portion 40 fulcrums about the tire rim edge to drive the pry-off tip 41 outwardly and thus initiate pry-off of the cover until a shoulder 43 at juncture of the head flange portion 39 with the intermediate or body portion 37 engages against the outer side of the tire and fulcruming thereagainst in the continued levering of the tool completes the ejection of the cover.

It will be understood that modifications and variations may be effected without departing from the scope of the novel concepts of the present invention.

I claim as my invention:

1. A wheel cover pry-off tool of generally wedge shaped configuration having a handle and a stepped flanged portion defining a pry-off head; said pry-off head including a depending inturned angular flange connected at one end to said handle and defining with said handle an inner fulcrum; a depending intermediate flange having one end connected to the other end of said angular flange of sufficient length to extend behind a wheel cover, and a depending flange connected to the other end of said intermediate flange and defining with said intermediate flange an outer fulcrum, said last mentioned flange terminating at the other end in a cover pry-off edge, said pry-off edge being of a generally arcuate configuration generally in the longitudinal plane of the tool conforming generally to the curvature of the surface to be engaged by said edge to aid in the pry-off of a wheel cover.

2. A wheel cover pry-off tool of generally wedge shaped configuration having a handle and a stepped flanged portion defining a pry-off head, said pry-off head including a depending inturned angular flange connected at one end to said handle and defining with said handle an inner fulcrum, a depending intermediate flange having one end connected to the other end of said angular flange of sufficient length to extend behind a wheel cover, and a depending flange connected to the other end of said intermediate flange and defining with said intermediate flange an outer fulcrum, said last mentioned flange terminating at the other end in a cover pry-off edge, said pry-off edge being of a generally arcuate configuration generally in the longitudinal plane of the tool conforming generally to the curvature of the surface to be engaged by said edge to aid in the pry-off of a wheel cover, said handle being of a reinforced construction having a handle portion of transversely concave configuration, and an intermediate portion connected at one end to said handle portion and at the other end to said pry-off head and being of a transversely convex configuration.

References Cited in the file of this patent

UNITED STATES PATENTS

| | | |
|---|---|---|
| 597,286 | Horswill | Jan. 11, 1898 |
| 2,148,213 | Lyon | Feb. 21, 1939 |
| 2,311,789 | Taylor | Feb. 23, 1943 |
| 2,501,205 | Boucher | Mar. 21, 1950 |
| 2,503,683 | Perkins | Apr. 11, 1950 |

FOREIGN PATENTS

| | | |
|---|---|---|
| 22,362 | Great Britain | Oct. 10, 1907 |
| 421,574 | Great Britain | Dec. 24, 1934 |

OTHER REFERENCES

Popular Science (page 250), January 1948.